United States Patent
Hecht

(10) Patent No.: US 10,347,042 B2
(45) Date of Patent: Jul. 9, 2019

(54) IMPORTANCE SAMPLING OF SPARSE VOXEL OCTREES

(71) Applicant: PIXAR, Emeryville, CA (US)

(72) Inventor: Florian Hecht, Berkeley, CA (US)

(73) Assignee: Pixar, Emeryville, CA (US)

( * ) Notice: Subject to any disclaimer, the term of this patent is extended or adjusted under 35 U.S.C. 154(b) by 501 days.

(21) Appl. No.: 14/210,138

(22) Filed: Mar. 13, 2014

(65) Prior Publication Data

US 2015/0262416 A1    Sep. 17, 2015

(51) Int. Cl.
*G06T 17/00* (2006.01)
*G06T 15/08* (2011.01)

(52) U.S. Cl.
CPC ............ *G06T 17/005* (2013.01); *G06T 15/08* (2013.01)

(58) Field of Classification Search
None
See application file for complete search history.

(56) References Cited

U.S. PATENT DOCUMENTS

| | | | | |
|---|---|---|---|---|
| 2010/0198877 A1* | 8/2010 | Gruenschloss | ... | G06F 17/30961 707/797 |
| 2013/0335406 A1* | 12/2013 | Tabellion | ............... | G06T 17/005 345/419 |

OTHER PUBLICATIONS

Per H. Christensen, Dana Batali, "An Irradiance Atlas for Global Illumination in Complex Production Scenes", 2004, ACM, EGSR'04 Proceedings of the Fifteenth Eurographics conference on Rendering Techniques, pp. 133-141.*

J. David MacDonald, Kellogg S. Booth, "Heuristics for ray tracing using space subdivision", 1990, Springer-Verlag, The Visual Computer (1990), vol. 6, pp. 153-166.*

Balazs Csebfalvi, Laszlo Szirmay-Kalos, "Monte Carlo Volume Rendering", Oct. 24, 2003, IEEE, Proceedings of the 14th IEEE Visualization Conference (VIS'03), pp. 449-456.*

Cyril Crassin, "GigaVoxels: A Voxel-Based Rendering Pipeline for Efficient Exploration of Large and Detailed Scenes", 2011, Thesis, Université de Grenoble.*

K. Perlin, "An Image Synthesizer", Jul. 26, 1985, ACM, Computer Graphics, Proceedings SIGGRAPH '85, vol. 19, No. 3, pp. 287-296.*

Darwyn R. Peachey, "Solid Texturing of Complex Surfaces", Jul. 26, 1985, ACM, Computer Graphics, Proceedings SIGGRAPH '85, vol. 19, No. 3, pp. 279-286.*

Henrik Wann Jensen, Per H. Christensen, "Efficient Simulation of Light Transport in Scenes with Participating Media using Photon Maps", Jul. 24, 1998, ACM, SIGGRAPH '98 The 25th International Conference on Computer Graphics and Interactive Techniques, pp. 311-320.*

(Continued)

*Primary Examiner* — Robert Bader
(74) *Attorney, Agent, or Firm* — Patterson + Sheridan, LLP

(57) ABSTRACT

Techniques are disclosed for generating quality renderings of volumes by sampling a volume light by generating and analyzing a sparse voxel octree. In one embodiment, a volumetric light source may be divided into voxels and importance information stored in an octree. An importance value may be determined for each voxel based on the amount of emitted light in the region associated with that voxel. Importance values regarding the individual voxels may be stored in the leaves of the octree. Each interior node may be associated with an importance value equal to the sum of the importance values of its children. The root node may be associated with the total importance of the entire octree.

21 Claims, 7 Drawing Sheets

(56) References Cited

OTHER PUBLICATIONS

Henrik Wann Jensen, "Global Illumination using Photon Maps", Jun. 19, 1996, Springer, Rendering Techniques '96, pp. 21-30.*

Jane Wilhelms, Allen Van Gelder, "Octrees for Faster Isosurface Generation", Jul. 1992, ACM, ACM Transactions on Graphics, vol. 11, Issue 3, pp. 201-227.*

H. Woo, E. Kang, Semyung Wang, Kwan H. Lee, "A new segmentation method for point cloud data", 2002, Elsevier Science Ltd., International Journal of Machine Tools & Manufacture 42 (2002), pp. 167-178.*

Donald J. R. Meagher, "Octree Generation, Analysis and Manipulation", Apr. 1982, Rensselear Polytechnic Institute, Image Processing Lab, Technical Report, IPL-TR-027.*

Andrew S. Glassner, "Space Subdivision for Fast Ray Tracing", Oct. 1983, IEEE, IEEE Computer Graphics and Applications, vol. 4, Issue 10, pp. 15-22.*

* cited by examiner

IMPORTANCE SAMPLING OF SPARSE VOXEL OCTREES

BACKGROUND

Field of the Invention

Embodiments presented herein generally relate to volume rendering and more specifically to importance sampling of sparse voxel octrees.

Description of the Related Art

Importance sampling of volumes, such as a volume light source, has been performed using regular grids. Specifically, a regular grid provides a structure for determining the contribution of "important" voxels when rendering a three dimensional volume. One challenge in using regular grids, however, is that importance sampling does not work well, if at all, in sparse data situations.

SUMMARY

One embodiment includes a method sampling voxel data stored by an octree decomposition. This method may generally include traversing a path in the octree decomposition until reaching a leaf node. The traversal may itself include identifying, for a current node of the octree decomposition, an importance value assigned to each of a plurality of child nodes of the current node, and selecting one of the child nodes of the current node as a next current node, until reaching the leaf node. The selection at each current may weighted based on the importance values of the child nodes of the current node. Once the selected child node is a leaf node of the octree decomposition, a voxel associated with the leaf node is selected to sample. The lighting intensity of the selected voxel may be returned as the sampled volxel data. That is, once voxel is selected using this importance sampling process, the lighting intensity of the chosen voxel is returned and may be used, e.g., for rendering a volumetric light source.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
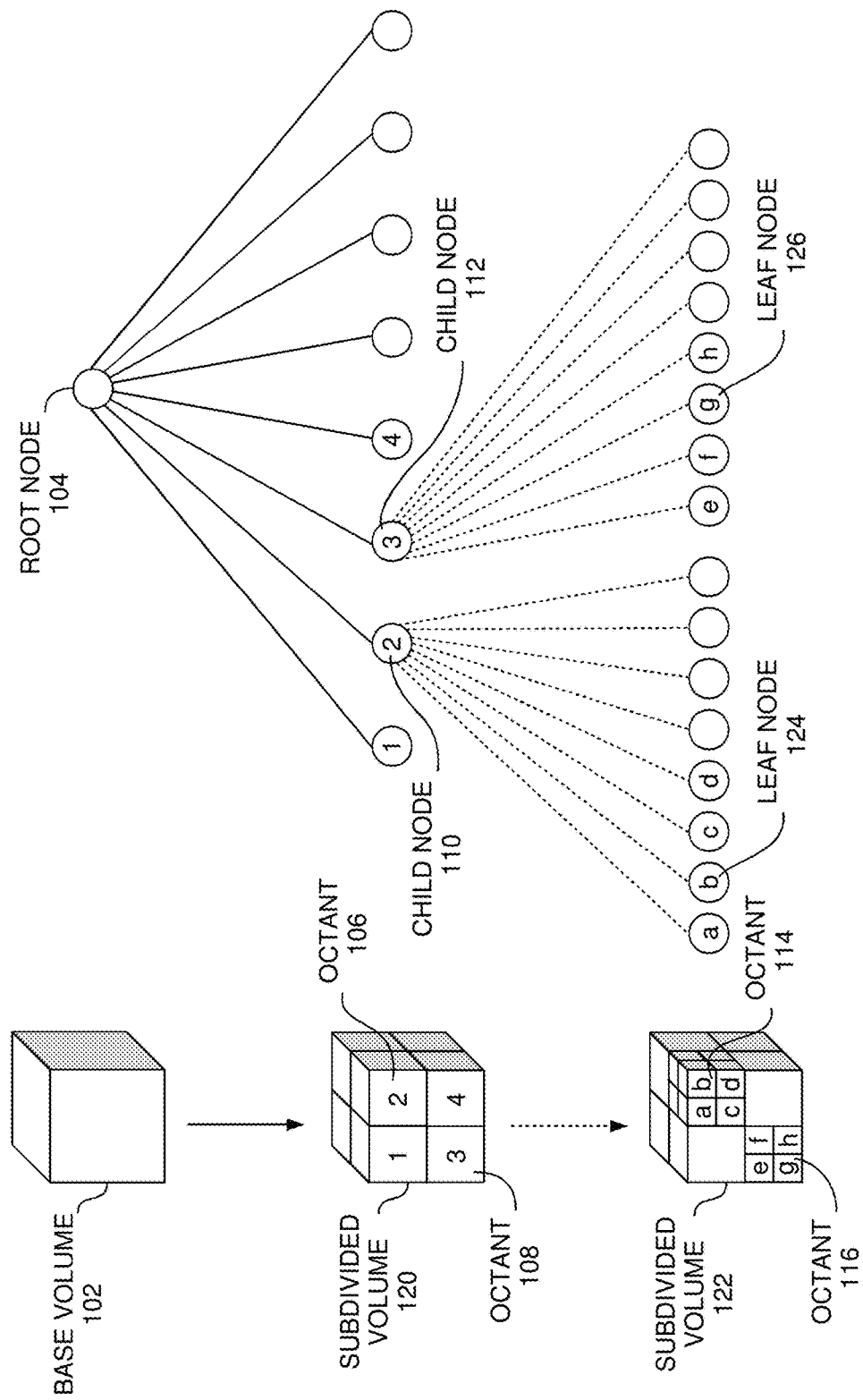
FIG. 1 illustrates an octree decomposition process, according to one embodiment.

Importance sampling of volumes, such as a volume light source, has been performed using regular grids. The regular grid provides a structure for determining the contribution of "important" voxels when rendering a three dimensional volume. An octree is a form of a regular grid structure. An octree is created by successively subdividing a volume of interest into successively smaller cubes or octants. Octrees are a data structure comprising a tree of nodes. In an octree, each node acts as a parent node to eight child nodes and as one of eight child nodes to a parent node. The exceptions are the top-most node or "root node" from which all nodes descend (i.e. the root is not a child of any node) and the bottom-most level where the subdivision stopped made up of the "leaf nodes" (i.e. the leaf nodes are not a parent to other nodes). Leaf nodes which contain sample data (some may be empty) are accessed by traversing the octree structure until reaching a leaf node of interest.

Importance sampling has been used in applications such as selecting pixel values from image maps during rendering. Image pixels form a regular grid that is not sparse, unlike an octree data structure. When constructing a voxel octree data structure, the subdivision process may stop when a given node does not contain data, the given node fully contains the same data value, or a predetermined subdivision limit is reached. Truncating branches of the octree structure, when child nodes no longer store sample data, allows the sparse data volume to be stored efficiently, as well as reduces the time needed to traverse the tree. One challenge in using sparse voxel octrees, however, is that importance sampling does not work well, if at all, for sparse data structures.

Embodiments of the provide techniques for generating high quality renderings of volumes by efficiently sampling a volume light by generating and analyzing a sparse voxel octree. In one embodiment, a volumetric light source may be divided into voxels and importance information for the light source stored in an octree. Specifically, an importance value may be determined for each voxel based on the amount of emitted light in the region associated with that voxel. Importance values regarding a distinct group of voxels are stored in each distinct leaf of the octree. Each interior node (i.e., non-leaf node) may be assigned an importance value equal to the sum of the importance values of its children. The root node may be associated with the total importance of the entire octree.

Voxels are selected for sampling by traversing the octree from top to bottom. Specifically, at each node a random (or pseudo-random) value may used to choose one of the children, weighted according to their importance. The importance of each child of a node may be determined using a cumulative density function (CDF), normalizing the importance of all the children of that node relative to one-another. A child node may be selected, based on the relative importance of the children. This process is repeated until a reaching a leaf node, which is also chosen with a likelihood proportional to its importance. When repeated, this process leads to a distribution of chosen voxels for sampling that provide a higher quality rendering when illuminating a scene from a volumetric light source. That is, each path of traversal is done at random with individual path selections being made relative to the importance of each node. Doing so allows for voxel sampling that introduces interesting and more-realistic variations when sampling a volumetric light source as part of rendering images of a 3D volume.

FIG. 1 illustrates an octree decomposition process according to one embodiment. As shown, FIG. 1 includes a base volume 102, a root node 104, octants 106, 108, 114, and 116, child nodes 110 and 112, leaf nodes 124 and 126, and subdivided volumes 120 and 122. Generally, octree decomposition is a progressive subdivision of a volume into smaller sub-volumes ("octants"). The subdivision process stops when an octant no longer stores any data or some predetermined stopping condition is reached. Stopping conditions may include a predetermined number of subdivision iterations, a floating point limit, or some other threshold. Base volume 102 is the entire volume. Root node 104 represents an octree data structure that contains information for the entire volume, such as total volume extents or dimensions. Root node 104 can be a bounding volume, or a clipped volume. Base volume 102 includes every object in the volume and root node 104 contains information related to every object in the base volume. Dividing the base volume 102 in half along the three dimensions yields subdivided volume 120. The octants are numbered for illustration and discussion purposes, as other ordering schemes may be used. Data specific to the base volume 102, such as volume extents/coordinates, pointers to child nodes, etc. are stored in a data structure associated with root node 104. Data specific for octants are stored in child node data structures. Subdivided volume 120 has a total of eight octants. Corresponding to these octants in subdivided volume 120, root node 104 has eight child nodes. Data specific to octant 106 is contained in child node 110 and data specific to octant 108 is contained in child node 112. The correspondence between the octants and child nodes is shown by the numeric labels on the octants and the circles. Each child node (of the root node 104) itself is associated with eight child nodes that correspond to the octants generated by the next subdivision. The final subdivision generates "leaf nodes" which may contain data but do not link to any other nodes. While FIG. 1 shows only two subdivision iterations, there may be an arbitrary number of subdivision iterations subject to the stopping conditions described previously.

The relationship between octants and child nodes can be seen first at the level of child node 110. The numbers in the circles representing the child nodes correspond to the numbers in the octants in subdivided volume 120. The solid lines illustrate the data connection between the child nodes, such as child node 110 and child node 112, to root node 104. Child nodes depend from parent nodes but child nodes do not directly depend from the other child nodes at the same level. The absence of dependency between child nodes allows an octree structure to truncate at nodes that do not contain any additional data.

Subdivided volume 122 illustrates the result of further subdividing octants 106 and 108. FIG. 1 shows a total number of two subdivision steps. Thus, while leaf nodes 116 and 118 are shown depending from child nodes 110 and 112 respectively, the connections illustrate how a child node may itself have child nodes as well. Labels in the circles again illustrate the correspondence to similarly labeled octants subdivided volume 122.

Leaf nodes are child nodes that represent a termination point of the subdivision iterations. Accordingly, leaf node 124 and leaf node 126 do not contain any child nodes. Leaf node 124 contains the volume data for octant 114 and leaf node 126 contains the volume data for octant 116, as subdivided from the original base volume 102.

One skilled in the art will recognize that at each successive subdivision, the processing and data storage requirements increase by at least a factor of eight. To reduce the overhead, the subdivision process may stop, e.g., when an octant does not contain data, contains a single data value, when a data value falls below a predetermined threshold, or a predetermined subdivision limit is reached. Resources are used more efficiently to construct an octree that fully characterizes the relationships of the data containing voxels. While the required memory and processing are minimized, the data structure is sparse and lacks the regular structure of a grid.

Figure 2:
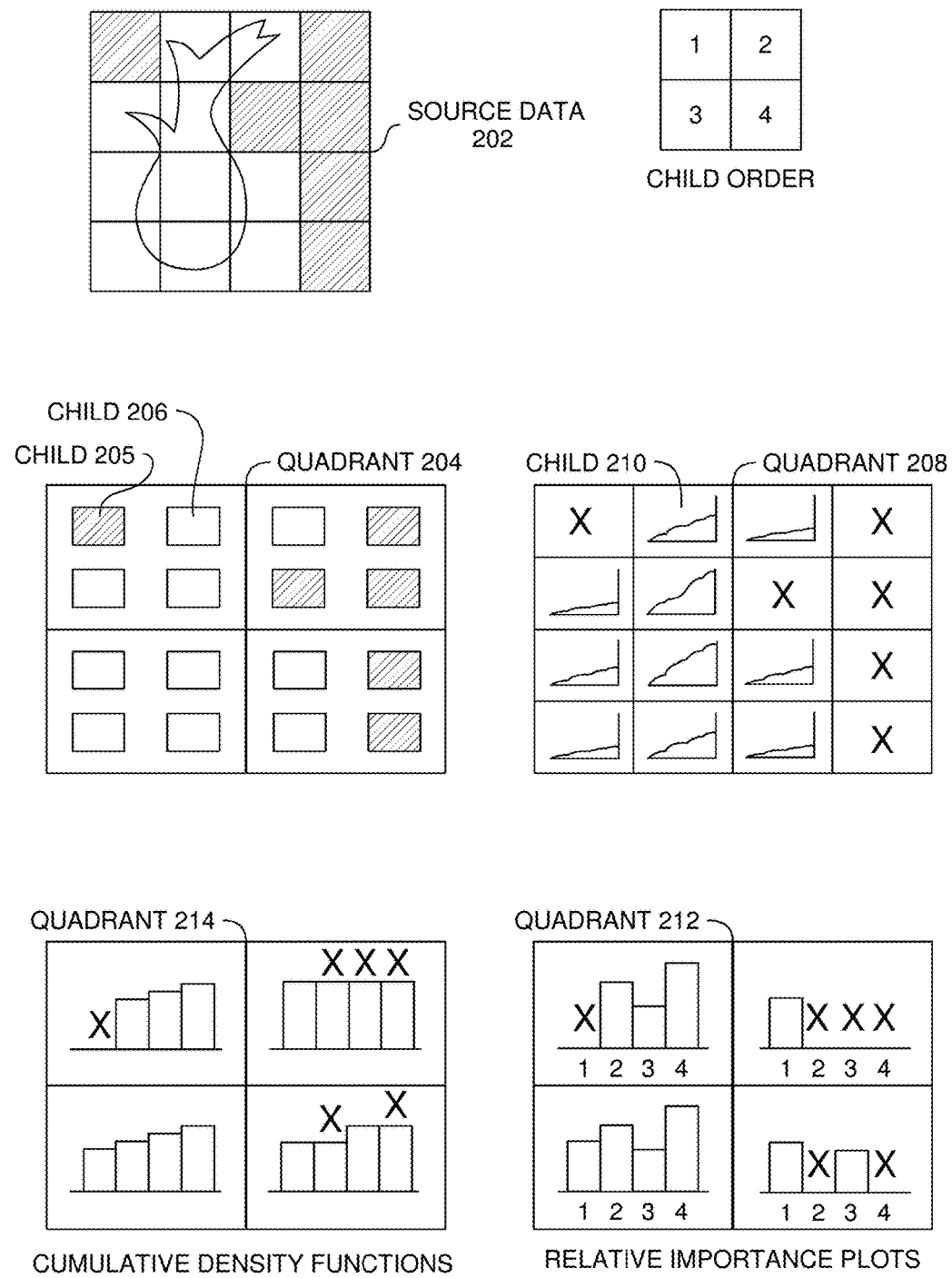
FIG. 2 illustrates an example of importance sampling in a sparse data structure, according to one embodiment.

FIG. 2 illustrates an example of importance sampling in a sparse data structure, according to one embodiment. FIG. 2 uses a quadtree model to illustrate importance sampling but one skilled in the art will recognize this may readily be extended to an octree. As shown, FIG. 2 includes source data 202, quadrant 204, child node 206, quadrant 208, child node 210, and quadrant 212 (204 and 205 are both quadrants and children, but on different levels of the tree). In this example, assume source data 202 represents a volume illumination source with a non-homogeneous distribution of light intensities, such as fire from a torch or candle, in a scene to be rendered. Source data 202 is divided into quadrants, and each quadrant is subdivided into four child regions. For this example, hash-marks are used to indicate source data 202 that does not include illumination intensity values (or has values below a given threshold). For example, quadrant 204 shows the relative positions of the child nodes with and without intensity data. Specifically, child node 205 has effectively no data and is drawn with a hash fill, and child node 206 has some intensity data with a relative contribution, with respect to the other children in quadrant 204. The relative contribution of child nodes of quadrant 204 is further illustrated in quadrant 208. As shown in quadrant 208, an Xs indicates no data contribution from a child node. For nodes with data that contributes to the illumination, the child stores a graph of the cumulative importance of intensity over the area covered by that child node. For example, child node 210 includes a cumulative importance table for all voxels in that quadrant.

Quadrant 212 depicts a relative importance of the child nodes in quadrant 204 to the overall intensity of quadrant 204. As shown, the intensities in the cumulative importance graphs, such as child 210, are normalized and plotted in quadrant 212. Quadrant 214 shows the cumulative density function (CDF) for the children in quadrant 204. In one embodiment, the CDF is determined by calculating the sum of the normalized contribution of each node to the overall intensity of the quadrant. The CDF may then be referenced, using a random (or pseudo-random) value between 0 and 1, to identify one of the children of node/quadrant 204.

In a regular structure, such as an array of image pixels, a normalized distribution of pixel values, for example, can be generated along each row in the image. Implementing random selection of pixel values from the normalized distribution of pixel values is straightforward, because the underlying structure is not sparse. In a sparse data structure, like a sparse voxel octree, the normalized distribution of the voxel values is modeled in the selection of a particular branch or node. Thus the structure and traversal process in a sparse voxel octree can be exploited to model the underlying distribution of the voxel values.

Figure 3:
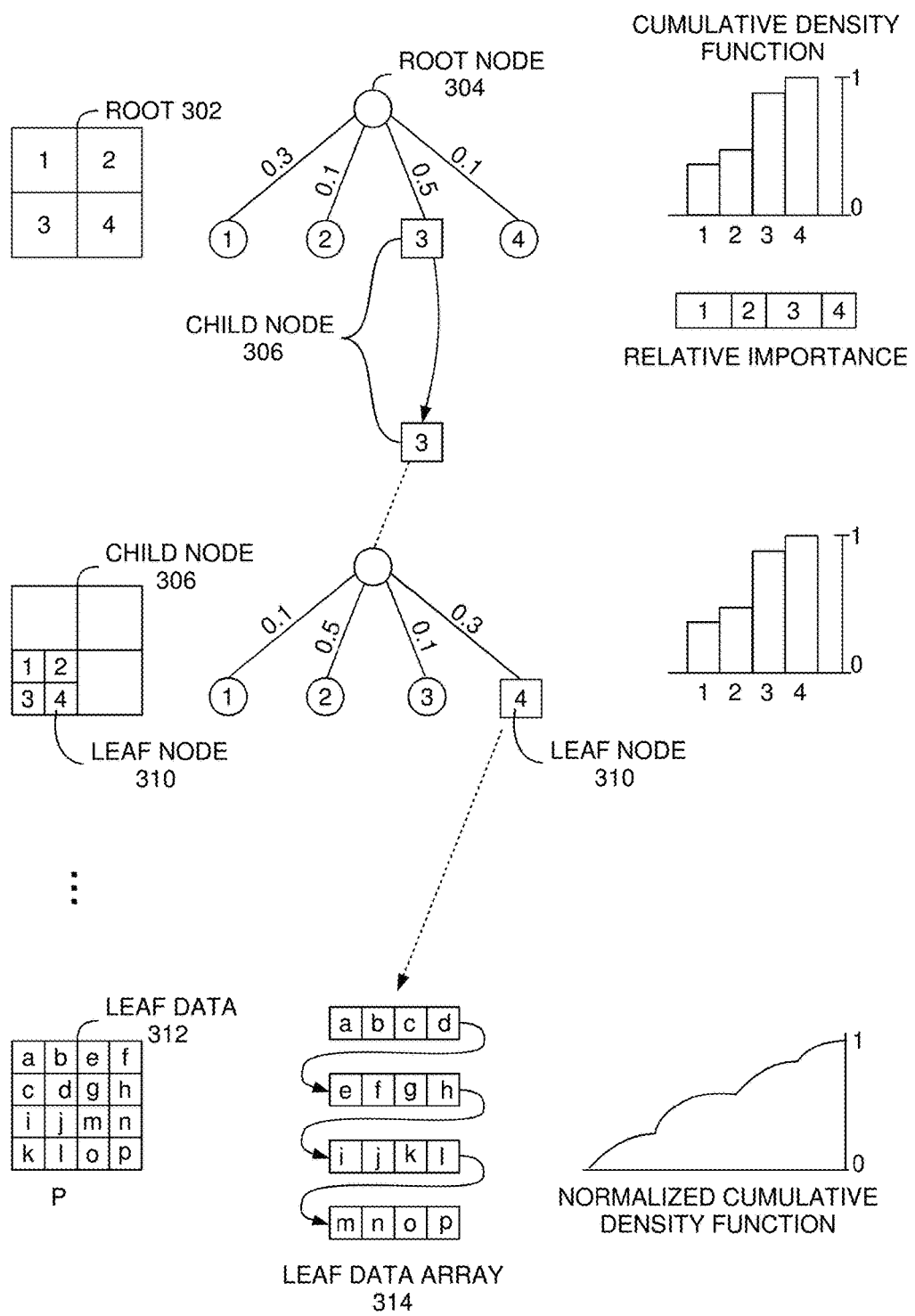
FIG. 3 illustrates a quadtree decomposition process incorporating relative importance of nodes, according to one embodiment.

FIG. 3 illustrates a quadtree decomposition process incorporating relative importance of nodes, according to one embodiment. As shown, FIG. 3 contains root node 302, root 304, child node 306, leaf node 310, leaf data 312, and leaf data array 314.

Root 304 of the volume corresponds to root node 302 of the quadtree decomposition. As shown, root 304 has four child nodes, and each node has a relative importance to the overall intensity of root node 302. For example, child node 306 supplies a relative contribution to root node 302 of 0.5. In one embodiment, the relative importance of child node 306 is derived using a sum of the relative contributions of the child nodes associated with child node 306. The contribution made by the other child nodes of root node 304 is determined in a similar manner.

Further, the normalized relative importance values are used in the importance sampling, which guides the traversal of the quadtree structure. For example, beginning at root 304, a random number is then used to select a child node. For example, assume a random (or pseudo-random) value between 0 and 1 is generated. Once generated, this value is used to select a child node based on the relative importance of the child nodes at that level of the hierarchy. For example, if the random value is between 0.0 and 0.3, node 1 is selected; if between 0.3 and 0.4 node 2 is selected; if between 0.4 and 0.9 node 3 is selected; and if between 0.9 and 1.0 node 4 is selected. Using this approach, as child node 306 has a relative importance of 0.5 this node contributes proportionally more to the overall intensity root node 302. As a result, child node 306 is selected more frequently than nodes with a lower relative contribution to the overall intensity of root node 302 (in this case, node 306 is selected half of the time).

Once a node at the current level (e.g., child node 306) is selected, the traversal may continue by repeating this process. For example, assume node 306 is selected based on a random (or pseudo-random) value and relative weights of the child nodes of root node 304. Thereafter, a random value is used to select among the four child nodes of node 306, again based on their relative importance. Assume for this example that node 310 is selected. Note, the relative importance of leaf node 310 is 0.3 is not the largest relative importance value of the nodes at this level. Simply selecting the node with the greatest relative importance would result in selecting leaf node 312 whenever child node 306 is selected and produce undesirable artifacts in the rendered image as a result. In contrast, embodiments presented herein randomly select nodes using a normalized relative importance to introduce subtle variations in lighting, media transmission, etc. during rendering.

As shown, leaf data (i.e., the data of leaf node 312) is organized into four quadrants, with each quadrant containing four intensity values, i.e., with a z-order or Morton order. Note, one of skill in the art will recognize that there are many different orderings are possible for the intensity values. Since the leaf is a regular grid any method to importance sample a grid may be used to sample the leaf. In one embodiment, e.g., the order may string up all the voxels into a linear list, parsed row-by-row and then slice-by-slice for the octree. Three random (or pseudo-random) variables could also be used and x, y and z coordinates chosen one after the other. Ultimately, these techniques are equivalent in the end and will all select a single voxel according to its relative importance to the other voxels in the leaf.

In one embodiment, a normalized cumulative density function may be generated using an ordering scheme, as shown in leaf data array 314. An intensity value is determined from the leaf data array 314, which may be used to represent the intensity of the area covered by leaf node 310 in a rendered image. The combination of the normalized relative importance, the normalized cumulative density function, and randomized selection provides an efficient way to variably sample volume data to create rendering effects for volumetric light sources.

Figure 4:
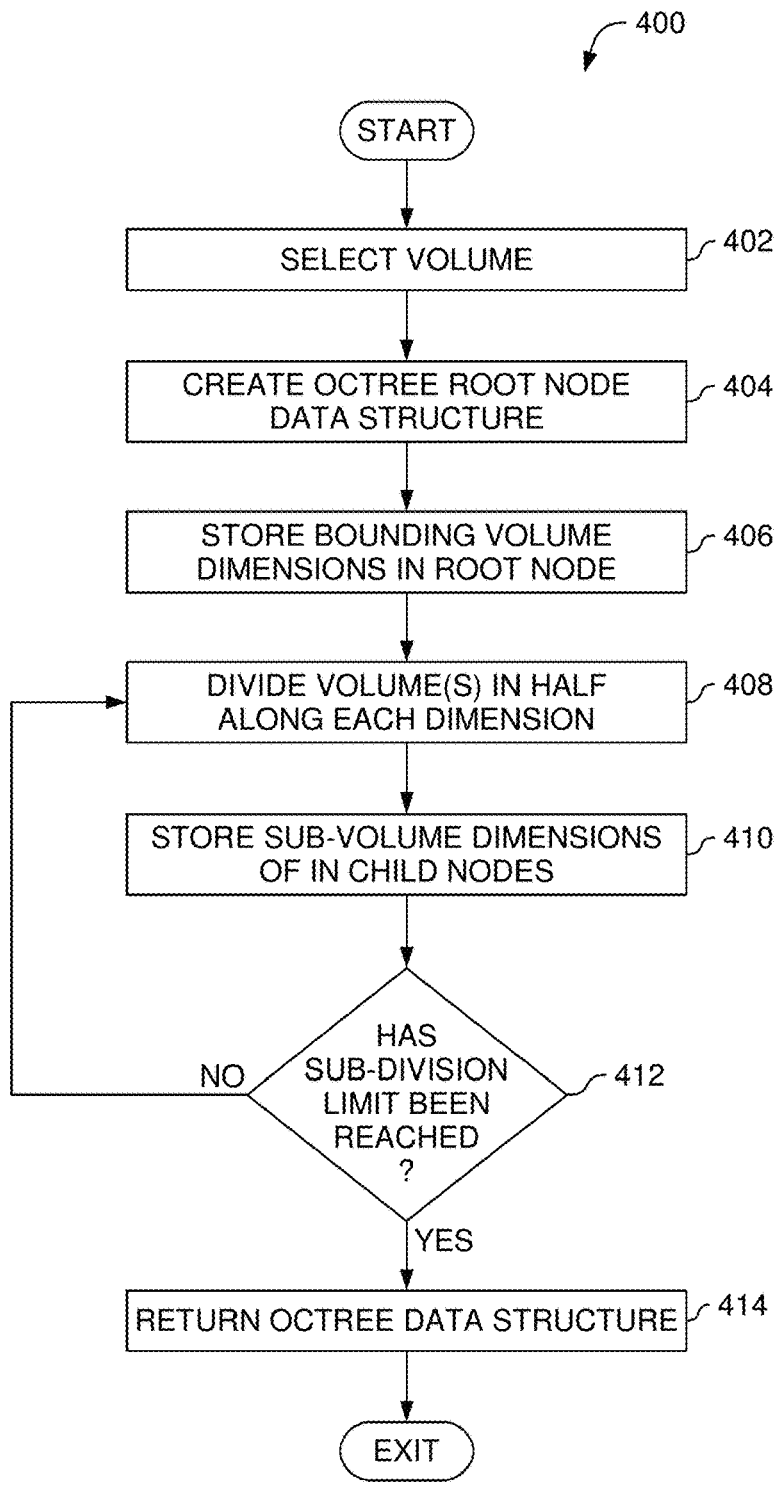
FIG. 4 illustrates a method for constructing an octree data structure, according to one embodiment.

FIG. 4 illustrates a method 400 for constructing an octree data structure according to one embodiment. Although method 400 is described in conjunction with FIGS. 1-3, 5-7, persons skilled in the art will understand that any system configured to perform the method steps, in any order, falls within the scope of the present invention. Also note, octrees, like tree data structures in general, are recursive in nature. Accordingly, one of skill in the art will recognize the method shown in FIG. 4 may be implemented using a recursive procedure which splits a node into eight children (or not depending on the sparse data) and calls itself for each child. The procedure is then started by invoking it for the root node.

As shown, the method 400 begins at step 402, where a rendering component selects volume data, such as a volume lighting object. At step 404, the rendering component computes volume boundaries of the volume lighting object. Doing so creates the light volume and an octree root node. The light volume boundaries are typically aligned along three orthogonal reference axes (referenced herein as X, Y, and Z). That is, the extent of the volume provides a box, at least relative to some coordinate system, e.g., it can be a distorted box in world coordinates.

At step 406, light volume data is stored in the root node data structure. And at step 408, the light volume is then divided along each of the X, Y and Z dimensions. At step 410, each resulting sub-volume (i.e., each child node) is tested to determine whether that child node contains intensity data. If a child node contains intensity data, a reference to the child node is added to the parent node. If a child node does not contain intensity data, it is flagged as being empty and the subdivision stops for that branch of the tree.

At step 412, the rendering component tests whether a subdivision limit has been reached. That is, the rendering component determines whether the octree decomposition is complete for the current volume. The termination condition can be based on a predetermined number of subdivisions, predetermined minimal dimensions of a child node, floating point limits, and the like. If the termination condition has been satisfied, then at step 414, the completed octree data structure is returned to the rendering component. Otherwise, the method returns to step 408, where the octree decomposition process continues with the next subdivision level. For example, after dividing a base volume represented by a root node into 8 volumes, represented by 8 child nodes, the volume represented by each child node is itself a candidate for being further subdivided into smaller octants.

Accordingly, after the initial subdivision, each volume is divided in half along the X, Y and Z dimensions. The result is that the octree decomposition can have eight child nodes, one for each volume resulting from the division along the X, Y and Z dimensions. More specifically, either a node is a leaf (i.e., has no children) or has eight nodes. Some of those eight children might be empty, but they are still children of the parent. Step 410 is repeated to evaluate each such child node to determine whether the second-level child node contains intensity data. If so, a reference to the child node is stored in the parent node data structure. If not, the child node becomes an empty leaf node, which is still a valid child.

In addition to performing a specific number subdivisions (e.g., creating a structure having a root node, a first set of 8 child nodes descendant from the root node, and each of child node itself having 8 child nodes). Other termination conditions may be performed at step 412, For example, in one embodiment, a rendering component may determine that an octant contains intensity data but the intensity data is homogeneous throughout the entire octant. In this event further subdivisions will not result in any finer resolution of intensity values so the subdividing process ceases. In such a case, a special leaf node is created that represents a homogeneous region, which can be importance sampled trivially by choosing a uniform location within the leaf.

Figure 5:
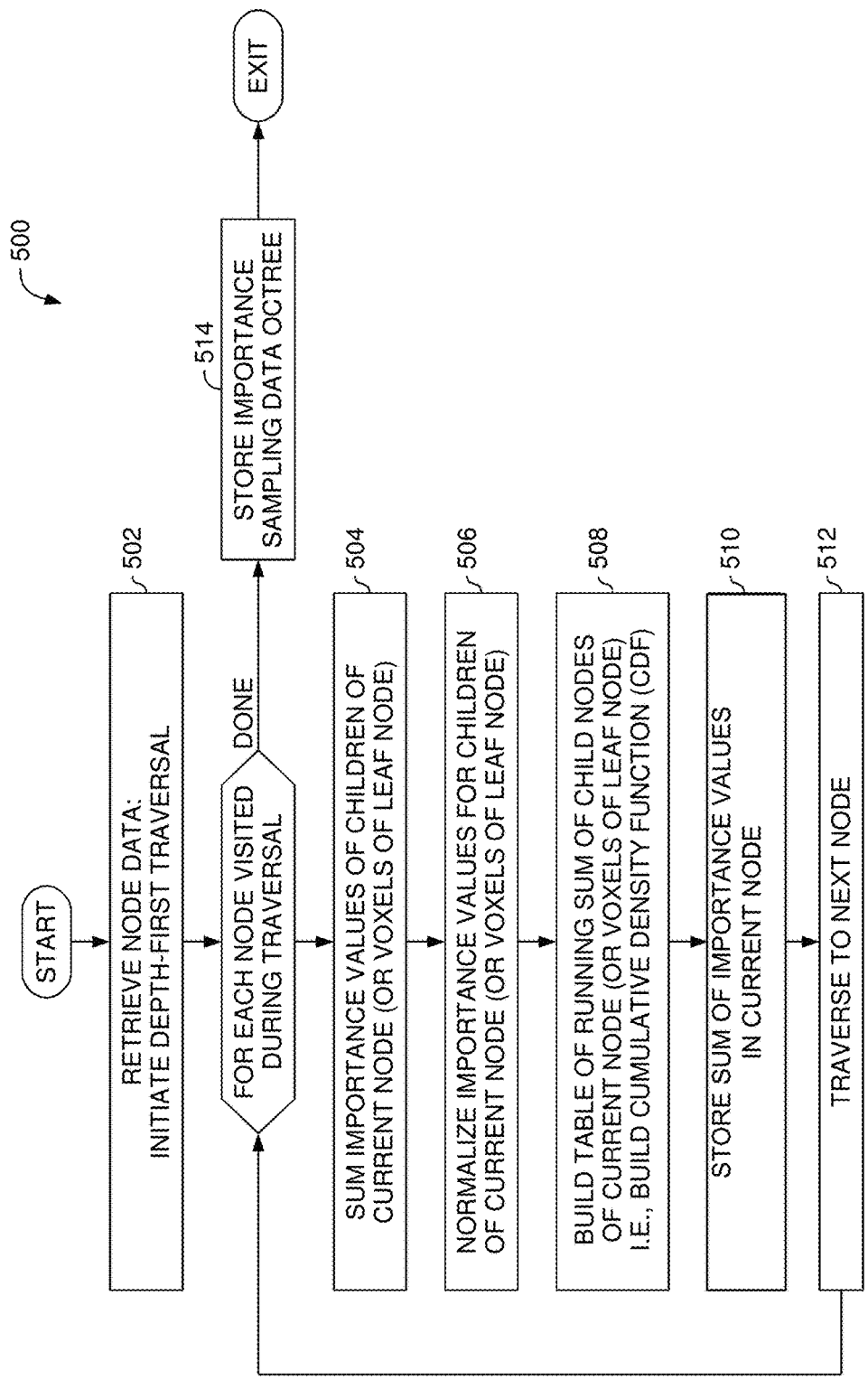
FIG. 5 illustrates a method for constructing an octree storing normalized relative importance values for nodes in the octree structure, according to one embodiment.

FIG. 5 illustrates a method 500 for constructing an octree storing normalized relative importance values for nodes in the octree structure, according to one embodiment. Although described in conjunction with FIGS. 1-4, 6-7, persons skilled in the art will understand that any system configured to perform the method steps, in any order, falls within the scope of the present invention.

As shown, the method 500 begins at step 502, where the rendering component retrieves node data for a volumetric light source. In one embodiment, the node data for the volumetric light source is stored in an octree decomposition, where each node corresponds to a progressively smaller region of voxels within the volumetric light source. Once retrieved, the rendering component begins a depth-first traversal of the node data. Accordingly, the rendering component initially descends into the node data until reaching a first leaf node, reaching a node representing the smallest number of voxels in the decomposition.

For each node, the rendering component determines both an accumulated importance for a given node and a relative importance for each child node of the current node, as described more fully below. First, at step 504, the rendering component calculates a sum of importance value for the children of the current node. For the leaf nodes, the sum corresponds to the sum of importance values for each voxel covered by the leaf node. Once the sum is calculated, at step 506 the importance values for the children of the current node are normalized relative to one another. For the leaf nodes, the importance values of the individual voxels covered by the leaf node are normalized relative to one another. In one embodiment, the normalized value for a given child (or voxel for a leaf node) may be determined as the importance value for that node divided by the total sum calculated at step 504. As described herein, the normalized value is used to select a path through an octree by choosing branches in the octree in proportion to the normalized importance e values.

Additionally, (at step 508) the rendering component may generate a running sum of child nodes of the current node. That is, the rendering component may build a cumulative density function for the child nodes of the current node (or voxels of a leaf node). In one embodiment, the table simplifies the process for selecting a child node relative to the normalized importance values. Specifically, to select a child node while performing an importance sampling process, the rendering component generates a random (or pseudo-random) value between 0 and 1 and indexes into the CDF table to determine which child of a current node to select. The process repeats until reaching a leaf node. At step 510, the rendering component stores the sum of the importance values of the current node. Doing so allows the parent to accumulate the total sum of importance for all the child nodes of that parent node (by summing the sum of each child). The parent repeats the procedure and includes the sum of each child node in its own sum, providing an accumulative sum to the parent. The process repeats up to the root node, which stores the accumulated sum of the entire octree. In addition, the normalized intensities may be stored in a cumulative importance/intensity table on each node. The rendering component can use the intensity values during rendering, as described herein.

After processing the current node (steps 504-510) the rendering component traverses to the next node (step 512). The depth first traversal then continues until each node has been processed by steps 504-510, with the last node being the root node. At step 514, once all nodes have been visited, the normalized intensities may be stored as a cumulative importance/intensity table, used during rendering.

Figure 6:
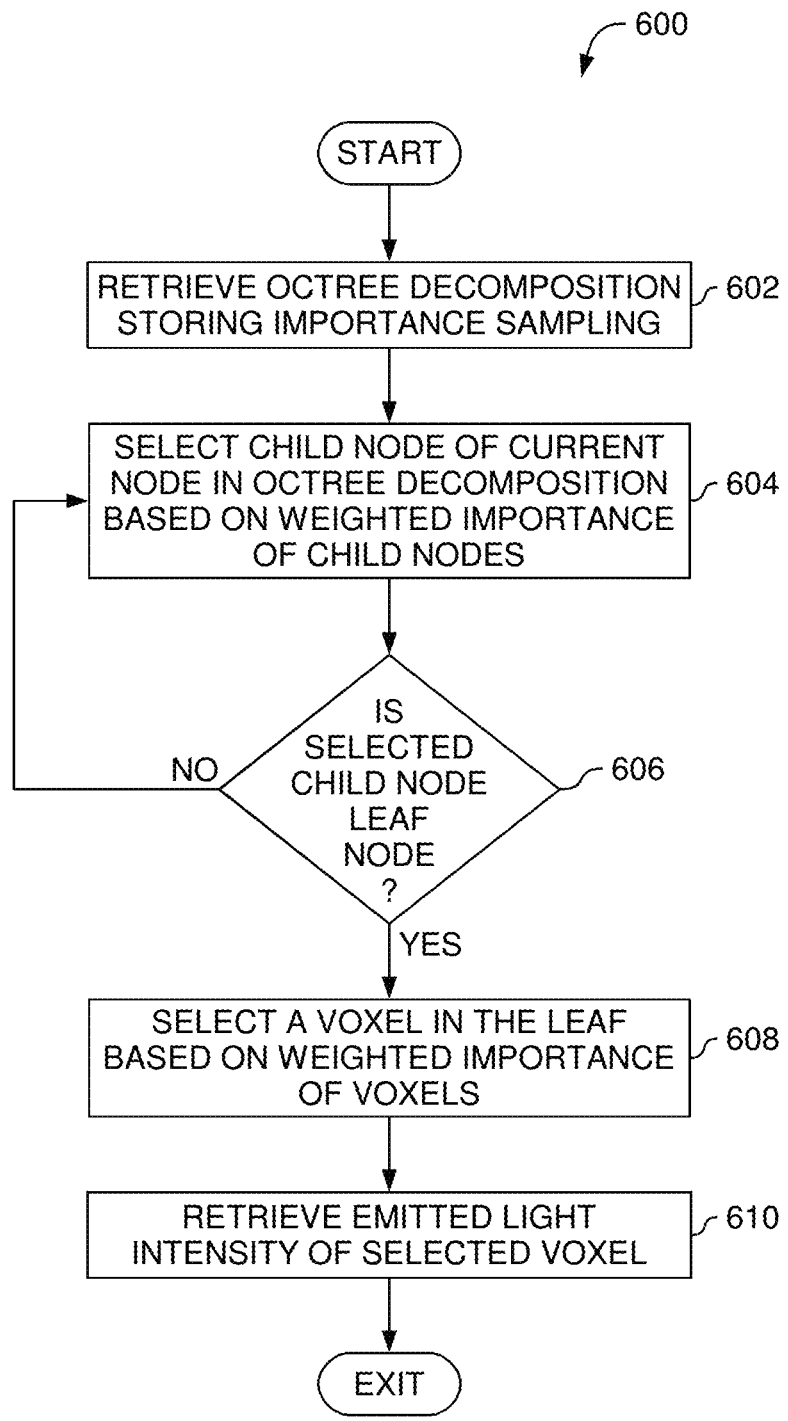
FIG. 6 illustrates a method for importance sampling in a sparse voxel octree, according to one embodiment.

FIG. 6 illustrates a method 600 for importance sampling in a sparse voxel octree, according to one embodiment. Although described in conjunction with FIGS. 1-5, 7, persons skilled in the art will understand that any system configured to perform the method steps, in any order, falls within the scope of the present invention.

In one embodiment, method 600 selects a voxel for lighting intensity sampling by traversing an octree decomposition from top to bottom. The leaf nodes of the octree decomposition may each store lighting data for a voxel (or voxels) in a volumetric light source. Each non-leaf node generally stores an accumulated measure of importance determined on the importance of the child nodes of that non-leaf node. The traversal results in a leaf node being chosen (and voxel data being selected) with a likelihood that is proportional to a given nodes importance. When repeated, the sampling of method 600 leads to a distribution of voxels chosen for sampling that can lead to a higher quality rendering when illuminating a scene from a volumetric light source (e.g., a torch) by creating subtle variation in rendering that leads to a more realistic rendered appearance of a volumetric light source.

As shown, the method 600 begins at step 602, where a rendering component retrieves an octree decomposition storing lighting importance determined for each voxel represented by the octree decomposition. As noted, the lighting importance for a given voxel may be based on the amount of emitted light in the region associated with that voxel.

At step 604, the rendering component selects a child node of a current node based on a weighted importance assigned to the child nodes. In one embodiment, the initial current node is the root node of the octree decomposition. Further, the child node may be selected from the child nodes of the current node randomly, relative to the weighted importance of each child node. For example, root node 304 (of FIG. 3) has child nodes 1, 2, 3, and 4. In turn, these nodes have importance values of 0.3, 0.1, 0.5, and 0.1, respectively. These values are determined relative to the importance of the lighting contributions of the children of each of these four nodes, down to the relative lighting contributions of individual voxels. Thus, in this example, node 3 (with an assigned importance of 0.5) would be selected fifty percent of the time using a random selection, while node 1 (with an assigned importance of 0.3) would be selected thirty percent of the time using a random selection.

Returning to the method 600, at step 606, the rendering component determines whether the selected node is a leaf node of the octree decomposition. If not, then the selected node becomes the current node, and step 604 is repeated. Thus, after descending from the root node to a first-level child node, the rendering component selects a child of the first-level child node, again based on a weighted random selection. This process repeats until the selected child node of the current node is a leaf node. Note, for an octree decomposition, each level contains (at most) eight children. As a result, an octree of N levels has a path space of $8^N$ paths, each of which may be traversed from the root node to one of the leaf nodes. Method 600 selects a path to traverse from this space by selecting path segments based on the relative importance of the nodes at each level of the octree.

Returning to the method 600, at step 606, once the rendering component traverses the octree to a leaf node, at step 608, the rendering component selects a voxel in the leaf node based on a weighted importance of the voxels in that leaf node. At step 610, the rendering component retrieves an emitted light intensity for the selected voxel. Like each child of a parent node, each voxel associated with the leaf node may have an importance value, normalized relative to one another as described above in conjunction with method 500 of FIG. 5. In such a case, a weighted random selection is made based on the normalized relative importance of the voxels in the leaf node. Once a voxel is selected using this importance sampling process, the lighting intensity of the chosen voxel is returned and used for rendering a volumetric light source.

Figure 7:
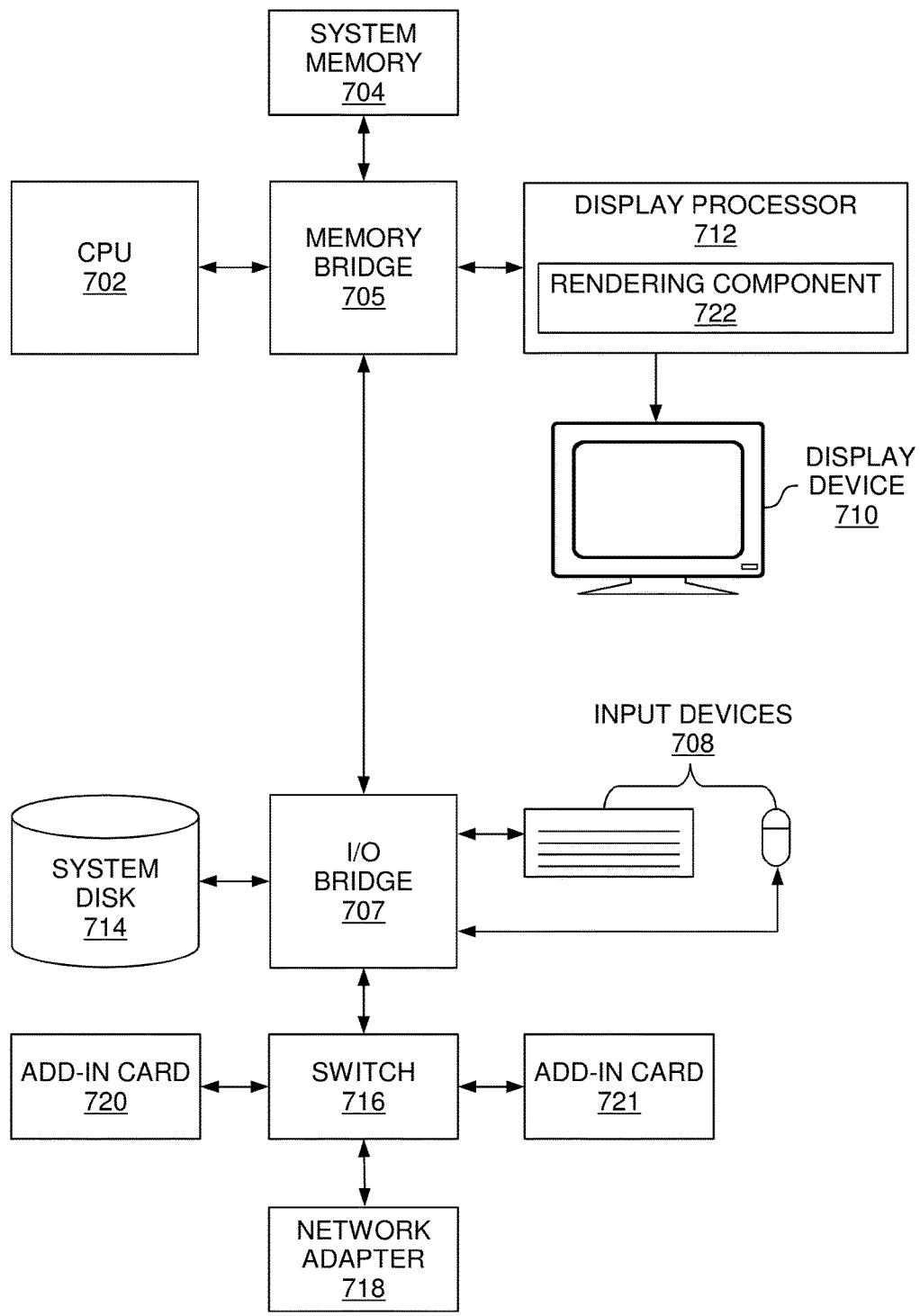
FIG. 7 illustrates an example computer system configured to carry out volume rendering based on sparse voxel octrees, according to one embodiment.

FIG. 7 illustrates an example computer system configured to carry out volume rendering based on sparse voxel octrees, according to one embodiment. This figure in no way limits or is intended to limit the scope of the present invention.

System 700 may be a personal computer, video game console, personal digital assistant, rendering engine, or any other device suitable for practicing one or more embodiments of the present invention.

As shown, system 700 includes a central processing unit (CPU) 702 and a system memory 704 communicating via a bus path that may include a memory bridge 705. CPU 702 includes one or more processing cores, and, in operation, CPU 702 is the master processor of system 700, controlling and coordinating operations of other system components. System memory 704 stores software applications and data for use by CPU 702. CPU 702 runs software applications and optionally an operating system. Memory bridge 705, which may be, e.g., a Northbridge chip, is connected via a bus or other communication path (e.g., a HyperTransport link) to an I/O (input/output) bridge 707. I/O bridge 707, which may be, e.g., a Southbridge chip, receives user input from one or more user input devices 708 (e.g., keyboard, mouse, joystick, digitizer tablets, touch pads, touch screens, still or video cameras, motion sensors, and/or microphones) and forwards the input to CPU 702 via memory bridge 705.

Display processing unit (GPU) 712 is coupled to memory bridge 705 via a bus or other communication path (e.g., a PCI Express, Accelerated Graphics Port, or HyperTransport link); in one embodiment GPU 712 includes at least one graphics processing unit (GPU) and graphics memory (not shown) supporting a display processing function. Graphics memory includes a display memory used for storing pixel data for each pixel of an output image. Graphics memory can be integrated in the same device as the GPUs, connected as a separate device with the GPUs, and/or implemented within system memory 704.

As shown GPU 712 includes rendering component 722. Rendering component 722 controls rendering operations of the GPU 712. In one embodiment, e.g., rendering component 722 manages the octree subdivision processes described above. GPU 712 also contains scene volume memory. Scene volume memory is accessible by octree subdivision processes and contains relevant scene volume data. Scene volume memory can be integrated in the same device as GPU 712, connected as a separate device with GPUs, and/or implemented within system memory 704. Image buffer (not shown) is used for storing pixel data for each pixel of an output image that is generated by the volume ray tracing processes controlled by the rendering component 722.

GPU 712 periodically delivers pixels to display devices 710 (e.g., a screen or conventional CRT, plasma, organic light-emitting diode (OLED), surface-conduction electron-emitter display (SED), or liquid crystal display (LCD) based monitor or television). Additionally, GPU 712 may output pixels to film recorders adapted to reproduce computer generated images on photographic film. GPU 712 can provide display devices 710 with an analog or digital signal.

A system disk 714 is also connected to I/O bridge 707 and may be configured to store content and applications and data for use by CPU 702 and GPUs 712. System disk 714 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 716 provides connections between I/O bridge 707 and other components such as a network adapter 718 and various add-in cards 720 and 721. Network adapter 718 allows system 700 to communicate with other systems via an electronic communications network, and may include wired or wireless communication over local area networks and wide area networks such as the Internet.

Other components (not shown), including universal serial bus (USB) or other port connections, film recording devices, and the like, may also be connected to I/O bridge 707. For example, an audio processor may be used to generate analog or digital audio output from instructions and/or data provided by CPU 702, system memory 704, or system disk 714. Communication paths interconnecting the various components in FIG. 7 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, GPU incorporate circuitry optimized for graphics and video processing. In another embodiment, GPU incorporates circuitry optimized for general purpose processing. In yet another embodiment, GPUs 712 may be integrated with one or more other system elements, such as the memory bridge 705, CPU 702, and I/O bridge 707 to form a system on chip (SoC). In still further embodiments, GPUs are omitted and software executed by CPU 702 performs the functions of GPUs 712.

Pixel data can be provided to GPU 712 directly from CPU 702. In some embodiments of the present invention, instructions and/or data representing a scene are provided to a render farm or a set of server computers, each similar to system 700, via network adapter 718 or system disk 714. The render farm generates one or more rendered images of the scene using the provided instructions and/or data. These rendered images may be stored on computer-readable media in a digital format and optionally returned to system 700 for display. Similarly, stereo image pairs processed by GPU 712 may be output to other systems for display, stored in system disk 714, or stored on computer-readable media in a digital format.

Alternatively, CPU 702 provides GPU 712 with data and/or instructions defining the desired output images, from which GPU 712 generates the pixel data of one or more output images, including characterizing and/or adjusting the offset between stereo image pairs, in the case of stereoscopic images. The data and/or instructions defining the desired output images can be stored in system memory 704 or graphics memory within GPU 712. For example, CPU 702 could execute a client media player application (not shown) that receives a media stream from a content provider, and transmits the media stream to the GPU 712 for viewing on the display device 710. In an embodiment, GPU 712 includes 3D rendering capabilities for generating pixel data for output images from instructions and data defining the geometry, lighting shading, texturing, motion, and/or camera parameters for a scene. GPU 712 can further include one or more programmable execution units capable of executing shader programs, tone mapping programs, and the like.

CPU 702, render farm, and/or GPU 712 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 704 is connected to CPU 702 directly rather than through a bridge, and other devices communicate with system memory 704 via memory bridge 705 and CPU 702. In other alternative topologies GPU 712 is connected to I/O bridge 707 or directly to CPU 702, rather than to memory bridge 705. In still other embodiments, I/O bridge 707 and memory bridge 705 might be integrated into a single chip. The particular components shown herein are optional; for instance, any number of add-in cards or peripheral devices might be supported. In some embodiments, switch 716 is eliminated, and network adapter 718 and add-in cards 720, 721 connect directly to I/O bridge 707.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium(s) may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In sum, disclosed techniques implement importance sampling for sparse data structures encountered during volume rendering. Sparse data representations often occur when rendering complex illumination effects based on volumetric lights or illumination objects. Specifically, a rendering component creates a sparse voxel octree data structure for a volume data source (e.g. a volume light object) in order to provide efficient access to the volume data elements. The techniques use the relative importance values in a current octree node to produce samples of the volume data that reflect a distribution characterized by the proportional contributions of the child nodes of the current node. The normalized relative importance of a node is used when traversing the octree structure to select a path through the octree. Importance sampling is implemented on a sparse voxel octree through path selections that mirror the distribution of the relative importance values in a node. In addition, having traversed the octree to the leaf node data, a normalized cumulative density function may be used to select a data value from a probability distribution of data values based on the proportional contribution of the data values to the leaf node relative importance.

Importance sampling is a technique used in volume rendering to produce complex lighting effects and to sample discontinuous data structures. However, importance sampling proved difficult or impossible to implement on sparse data structures like a sparse voxel octree. Using the relative importance of contributions from underlying nodes in an octree structure, the process of traversing the octree models the distribution of the values in the volume. Importance sampling uses randomized selection from a representative distribution to generate samples as though the samples were selected from the desired distribution. By overlaying the distribution of the volume data values onto the octree traversal process, the difficulties presented by the sparse voxel octree are overcome with little loss in efficiency.

Another advantage in these techniques is that once the leaf node values are reached the representative value for the rendering is selected using the same distribution based on the relative contribution of the leaf node values as determined in the cumulative density function. While the foregoing is directed to embodiments of the present invention, other and further embodiments of the invention may be devised without departing from the basic scope thereof, and the scope thereof is determined by the claims that follow.

What is claimed is:

1. A method of sampling lighting intensity data stored by an octree decomposition which includes a plurality of nodes, the method comprising:
   generating, by operation of one or more computer processors, the octree decomposition by:
      creating a root node of the octree decomposition representing a volume containing lighting intensity data associated with a volumetric light source;
      dividing the volume into a plurality of sub-volumes, by repeatedly dividing each sub-volume into sub-volumes until one of a plurality of predetermined conditions is satisfied, wherein a portion of the plurality of sub-volumes contain the lighting intensity data, wherein a first one of the plurality of predetermined conditions comprises the respective sub-volume containing lighting intensity data with a single data value, wherein a second one of the plurality of predetermined conditions comprises the respective sub-volume containing lighting intensity data with data values below a predetermined threshold; and
      for each of the sub-volumes containing the lighting intensity data, storing the lighting intensity data within the sub-volume in a respective child node of the octree decomposition;
   determining, by operation of one or more computer processors, an importance value for each node of the octree decomposition containing the lighting intensity data, wherein the importance value for each node of the octree decomposition reflects a proportional contribution of lighting intensity from the node to its parent node;
   traversing, by operation of one or more computer processors, a path in the octree decomposition until reaching a leaf node containing the lighting intensity data based on the importance values for each node of the octree decomposition;
   selecting, by operation of one or more computer processors, a voxel associated with the leaf node to sample from a plurality of voxels of the volumetric light source;
   sampling, by operation of one or more computer processors, a lighting intensity of the selected voxel; and
   determining, by operation of one or more computer processors, a lighting contribution resulting from sampled light intensity of the selected voxel for one or more pixels in a rendered image of a three-dimensional (3D) graphics scene illuminated by the volumetric light source.

2. The method of claim 1, wherein the importance value for each leaf node is computed as a sum of an importance value of each voxel associated with the leaf node.

3. The method of claim 2, wherein selecting a voxel associated with the leaf node to sample, comprises:
   identifying the importance value of each voxel associated with the leaf node; and
   selecting one of the voxels associated with the leaf node, the selection being weighted based on the importance values of the voxels associated with the leaf node.

4. The method of claim 3, wherein the importance values of the voxels associated with the leaf node are normalized relative to one another such that the normalized importance values sum to a value of 1.

5. The method of claim 1, wherein the importance values assigned to child nodes of each node are normalized relative to one another such that the normalized importance values sum to a value of 1.

6. The method of claim 1, wherein the importance value for each non-leaf node is computed as an accumulated sum of importance values of each child node of the non-leaf node.

7. A computer-readable storage medium storing one or more application programs, which, when executed on a processor, perform an operation for sampling lighting intensity data stored by an octree decomposition comprising a plurality of nodes, the operation comprising:
  generating the octree decomposition by:
    creating a root node of the octree decomposition representing a volume containing lighting intensity data associated with a volumetric light source;
    dividing the volume into a plurality of sub-volumes, by repeatedly dividing each sub-volume into sub-volumes until one of a plurality of predetermined conditions is satisfied, wherein a portion of the plurality of sub-volumes contain the lighting intensity data, wherein a first one of the plurality of predetermined conditions comprises the respective sub-volume containing lighting intensity data with a single data value, wherein a second one of the plurality of predetermined conditions comprises the respective sub-volume containing lighting intensity data with data values below a predetermined threshold; and
    for each of the sub-volumes containing the lighting intensity data, storing the lighting intensity data within the sub-volume in a respective child node of the octree decomposition;
  determining an importance value for each node of the octree decomposition containing the lighting intensity data, wherein the importance value for each node of the octree decomposition reflects a proportional contribution of lighting intensity from the node to its parent node;
  traversing a path in the octree decomposition until reaching a leaf node containing the lighting intensity data based on the importance values for each node of the octree decomposition;
  selecting a voxel associated with the leaf node to sample from a plurality of voxels of the volumetric light source;
  sampling a lighting intensity of the selected voxel; and
  determining a lighting contribution resulting from the sampled light intensity of the selected voxel for one or more pixels in a rendered image of a three-dimensional (3D) graphics scene illuminated by the volumetric light source.

8. The computer-readable storage medium of claim 7, wherein the importance value for each leaf node is computed as a sum of an importance value of each voxel associated with the leaf node.

9. The computer-readable storage medium of claim 8, wherein selecting a voxel associated with the leaf node to sample, comprises:
  identifying the importance value of each voxel associated with the leaf node; and
  selecting one of the voxels associated with the leaf node, the selection being weighted based on the importance values of the voxels associated with the leaf node.

10. The computer-readable storage medium of claim 9, wherein the importance values of the voxels associated with the leaf node are normalized relative to one another such that the normalized importance values sum to a value of 1.

11. The computer-readable storage medium of claim 7, wherein the importance values assigned to child nodes of each node are normalized relative to one another such that the normalized importance values sum to a value of 1.

12. The computer-readable storage medium of claim 7, wherein the importance value for each non-leaf node is computed as an accumulated sum of importance values of each child node of the non-leaf node.

13. A system, comprising:
  a processor; and
  a memory storing one or more application programs, which, when executed on the processor, perform an operation for sampling lighting intensity data stored by an octree decomposition comprising a plurality of nodes, the operation comprising:
    generating the octree decomposition by:
      creating a root node of the octree decomposition representing a volume containing lighting intensity data associated with a volumetric light source;
      dividing the volume into a plurality of sub-volumes, by repeatedly dividing each sub-volume into sub-volumes until one of a plurality of predetermined conditions is satisfied, wherein a portion of the plurality of sub-volumes contain the lighting intensity data, wherein a first one of the plurality of predetermined conditions comprises the respective sub-volume containing lighting intensity data with a single data value, wherein a second one of the plurality of predetermined conditions comprises the respective sub-volume containing lighting intensity data with data values below a predetermined threshold; and
      for each of the sub-volumes containing the lighting intensity data, storing the lighting intensity data within the sub-volume in a respective child node of the octree decomposition;
    determining an importance value for each node of the octree decomposition containing the lighting intensity data, wherein the importance value for each node of the octree decomposition reflects a proportional contribution of lighting intensity from the node to its parent node;
    traversing a path in the octree decomposition until reaching a leaf node containing the lighting intensity data based on the importance values for each node of the octree decomposition;
    selecting a voxel associated with the leaf node to sample from a plurality of voxels of the volumetric light source;
    sampling a lighting intensity of the selected voxel; and
    determining a lighting contribution resulting from the sampled light intensity of the selected voxel for one or more pixels in a rendered image of a three-dimensional (3D) graphics scene illuminated by the volumetric light source.

14. The system of claim 13, wherein the importance value for each leaf node is computed as a sum of an importance value of each voxel associated with the leaf node.

15. The system of claim 14, wherein selecting a voxel associated with the leaf node to sample, comprises:
  identifying the importance value of each voxel associated with the leaf node; and
  selecting one of the voxels associated with the leaf node, the selection being weighted based on the importance values of the voxels associated with the leaf node.

16. The system of claim 15, wherein the importance values of the voxels associated with the leaf node are normalized relative to one another such that the normalized importance values sum to a value of 1.

17. The system of claim 13, wherein the importance values assigned to child nodes of each node are normalized relative to one another such that the normalized importance values sum to a value of 1.

18. The system of claim 13, wherein the importance value for each non-leaf node is computed as an accumulated sum of importance values of each child node of the non-leaf node.

19. The method of claim 1, further comprising:
determining, by operation of one or more computer processors, an importance value for each of the plurality of voxels of the volumetric light source based on an amount of emitted light in a region associated with the voxel of the volumetric light source.

20. The method of claim 1, wherein traversing the path in the octree decomposition comprises:
identifying, for a current node of the octree decomposition, the importance value assigned to each of a plurality of child nodes of the current node; and
selecting one of the child nodes of the current node as a next current node, wherein the selection is weighted based on the importance values of the child nodes of the current node.

21. The method of claim 1, wherein generating the octree decomposition further comprises:
creating a first leaf node of the octree decomposition representing a first sub-volume of the plurality of sub-volumes upon determining that the first sub-volume satisfies the first predetermined condition; and
creating a second leaf node of the octree decomposition representing a second sub-volume of the plurality of sub-volumes upon determining that the second sub-volume satisfies the second predetermined condition.

* * * * *